US007623272B2

(12) United States Patent
Dunham

(10) Patent No.: US 7,623,272 B2
(45) Date of Patent: Nov. 24, 2009

(54) METHOD AND SYSTEM FOR DIAGNOSING AN IMAGING SYSTEM

(75) Inventor: Bruce Matthew Dunham, Mequon, WI (US)

(73) Assignee: General Electric Company, Schenectady, NY (US)

( * ) Notice: Subject to any disclaimer, the term of this patent is extended or adjusted under 35 U.S.C. 154(b) by 732 days.

(21) Appl. No.: 11/086,536

(22) Filed: Mar. 22, 2005

(65) Prior Publication Data

US 2006/0215890 A1 Sep. 28, 2006

(51) Int. Cl.

| | |
|---|---|
| ***H04N 1/46*** | (2006.01) |
| ***H04N 1/407*** | (2006.01) |
| ***H04N 1/409*** | (2006.01) |
| ***G06T 5/00*** | (2006.01) |

(52) U.S. Cl. ........................ 358/3.26; 358/1.6; 358/504

(58) Field of Classification Search .................. 358/1.6, 358/1.9, 3.26, 406, 504, 518, 530; 382/128
See application file for complete search history.

(56) References Cited

U.S. PATENT DOCUMENTS

| | | | | |
|---|---|---|---|---|
| 4,637,040 | A | 1/1987 | Sohval et al. | |
| 4,689,809 | A * | 8/1987 | Sohval | 378/136 |
| 5,303,281 | A * | 4/1994 | Koller et al. | 378/134 |
| 5,550,889 | A | 8/1996 | Gard et al. | |
| 5,898,755 | A | 4/1999 | Meusel et al. | |
| 6,252,935 | B1 | 6/2001 | Styrnol et al. | |
| 6,480,572 | B2 | 11/2002 | Harris et al. | |
| 6,652,143 | B2 * | 11/2003 | Popescu | 378/207 |
| 6,744,845 | B2 | 6/2004 | Harding et al. | |
| 2002/0158632 | A1 * | 10/2002 | Sodickson | 324/307 |
| 2005/0024051 | A1 * | 2/2005 | Doddrell et al. | 324/307 |

* cited by examiner

*Primary Examiner*—James A Thompson
(74) *Attorney, Agent, or Firm*—Armstrong Teasdale LLP

(57) ABSTRACT

A method and system for diagnosing an imaging system are provided. The method includes varying a system parameter of the imaging system. The method further includes obtaining a first data set at a first state of the varied system parameter and a second data set at a second state of the varied system parameter.

19 Claims, 6 Drawing Sheets

METHOD AND SYSTEM FOR DIAGNOSING AN IMAGING SYSTEM

BACKGROUND OF THE INVENTION

This invention relates generally to imaging systems, and more particularly, to diagnostic imaging systems.

In imaging systems, small data errors may cause artifacts, such as smudges, spots, bands, center spots, rings, and streaks, to appear in the reconstructed image. The data errors may be a result of malfunctioning of the components of the imaging systems or may be caused by the patient, such as due to a patient's motion. Failure to account for these errors during image reconstruction may result in a loss in image quality. These errors also may cause a large discrepancy between the scanned object and the reconstructed image. Hence, such artifacts and data errors should be diagnosed and repaired prior to scanning an object to improve image quality and results.

Various methods are known for diagnosing an imaging system. One most commonly used method is manual diagnosis of the imaging system. The service engineer diagnoses the problem based on his past experience. However, this method may not work to identify the cause of certain types of artifacts that can arise from multiple causes. For example, a band artifact may be caused by a problem in a detector or due to the presence of particles in the x-ray beam path. To distinguish between the two causes, images can be acquired in both the cold state and hot state of an X-ray tube. For example, an image is acquired initially with the X-ray tube in a cold state. Then the X-ray tube is heated for approximately an hour or more, and another image is acquired. If the two images or scan data show any difference, the problem can be diagnosed as a particle in the beam path. However, these methods rely on the expertise of the operator and are often time consuming.

BRIEF DESCRIPTION OF THE INVENTION

In an exemplary embodiment of the invention, a method for diagnosing an imaging system is provided. The method includes varying a system parameter of the imaging system. The method further includes obtaining a first data set and a second data set for a first state and a second state of the varied system parameter, respectively. The first and second data sets are then compared for diagnosing the imaging system.

In another exemplary embodiment of the invention, an imaging system is provided. The imaging system includes an image acquisition portion for acquiring image data and a controller for controlling the image acquisition portion to vary a system parameter. The imaging system further includes a processor for comparing a first data set acquired at a first state of a varied system parameter with a second data set acquired at a second state of the varied system parameter.

DETAILED DESCRIPTION OF THE INVENTION

Various embodiments of the present invention provide a method and a system for diagnosing an imaging system. More specifically, various embodiments of the invention provide a method and system for diagnosing an imaging system by varying one or more system parameters. The system parameters that may be varied include, but are not limited to, focal spot position, focal spot size, beam voltage, beam current, magnet fields and RF fields. The imaging system generally acquires multiple images of an object at different states of a system parameter. These images are then compared for diagnosing problems, for example, image quality problems, in the imaging system.

Figure 1:
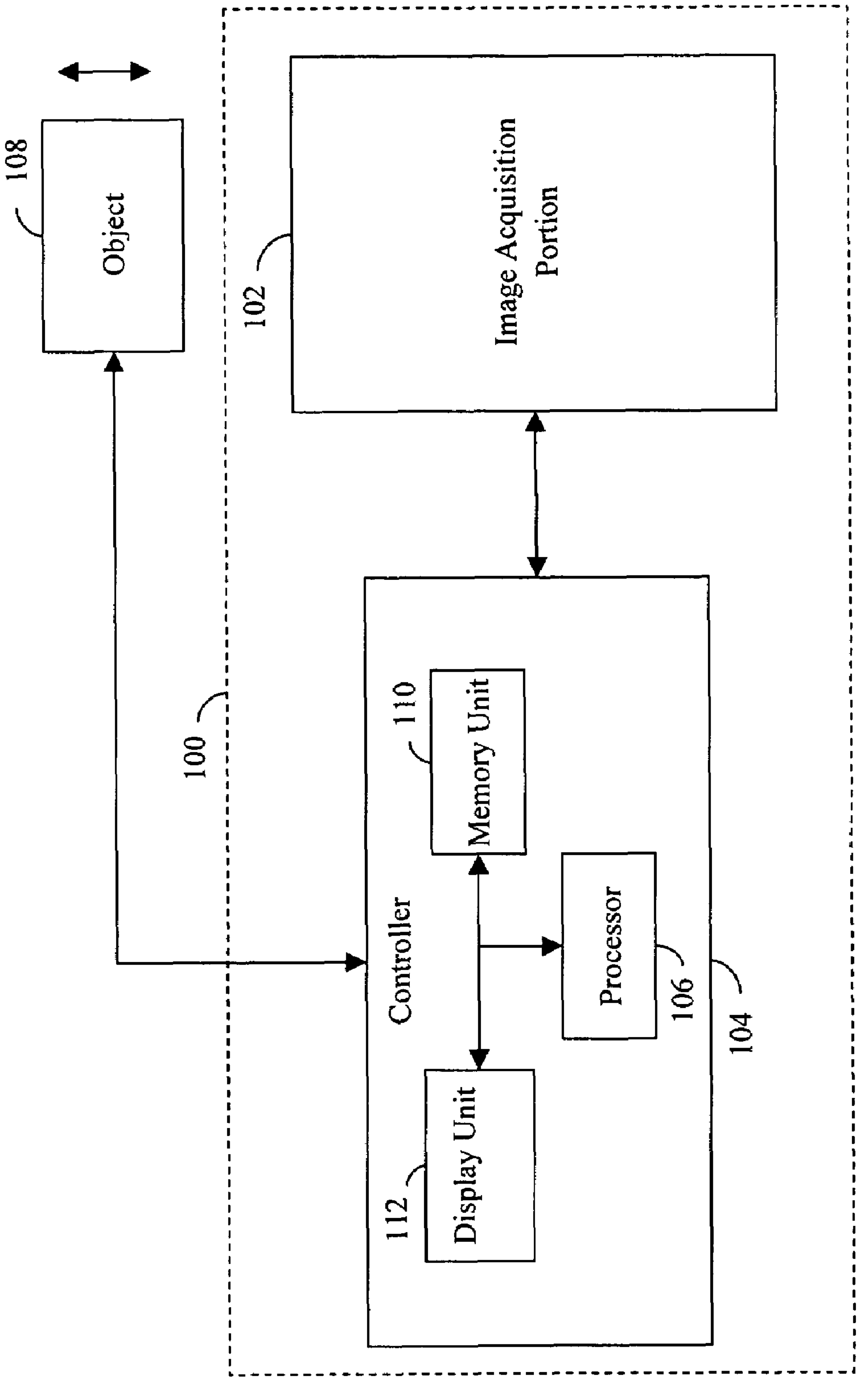
FIG. 1 is a block diagram of an imaging system in accordance with an exemplary embodiment of the invention.

FIG. 1 is a block diagram of an imaging system 100 in accordance with an embodiment of the invention. Examples of imaging system 100 include a Computed Tomography (CT) system, an X-ray system and a Magnetic Resonance Imaging (MRN) system. Imaging system 100 includes an image acquisition portion 102 and a controller 104. Controller 104 includes a processor 106. Image acquisition portion 102 acquires scan data after scanning an object 108 as is known.

Controller 104 includes processor 106, a memory unit 110, and a display unit 112. Controller 104 controls image acquisition portion 102 and is configured to vary system parameters of imaging system 100 as described in more detail herein. In operation, scan data is acquired by image acquisition portion 102 and is stored in memory unit 110. Processor 106 uses the scan data to reconstruct images of object 108. Processor 106 is further capable of comparing various images obtained at different states of the system parameter for use in diagnosing imaging system 100 as described in more detail herein. In various embodiments of the invention, memory unit 110 may be, for example, a magnetic or an optical storage media, such as a hard disk, a tape drive, a Compact Disc (CD), or a memory chip. Memory unit 110 also may be other similar means for loading computer programs or other instructions into the computer system, such as a Random Access Memory (RAM) etc. Further, display unit 112 may include a cathode ray display, a Liquid Crystal Display (LCD), or a plasma display. Display unit 112 is used to display an image of object 108.

In an embodiment of the invention, image acquisition portion 102 may use a magnetic field generated by a magnet to scan object 108. In another embodiment of the invention, image acquisition portion 102 may use X-rays to scan object 108. In order to diagnose imaging system 100, image acquisition portion 102 performs several scans of object 108 at different states of one or more system parameter. The variation in the images can be examined and/or analyzed to diagnose problems related to imaging system 100.

Figure 2:
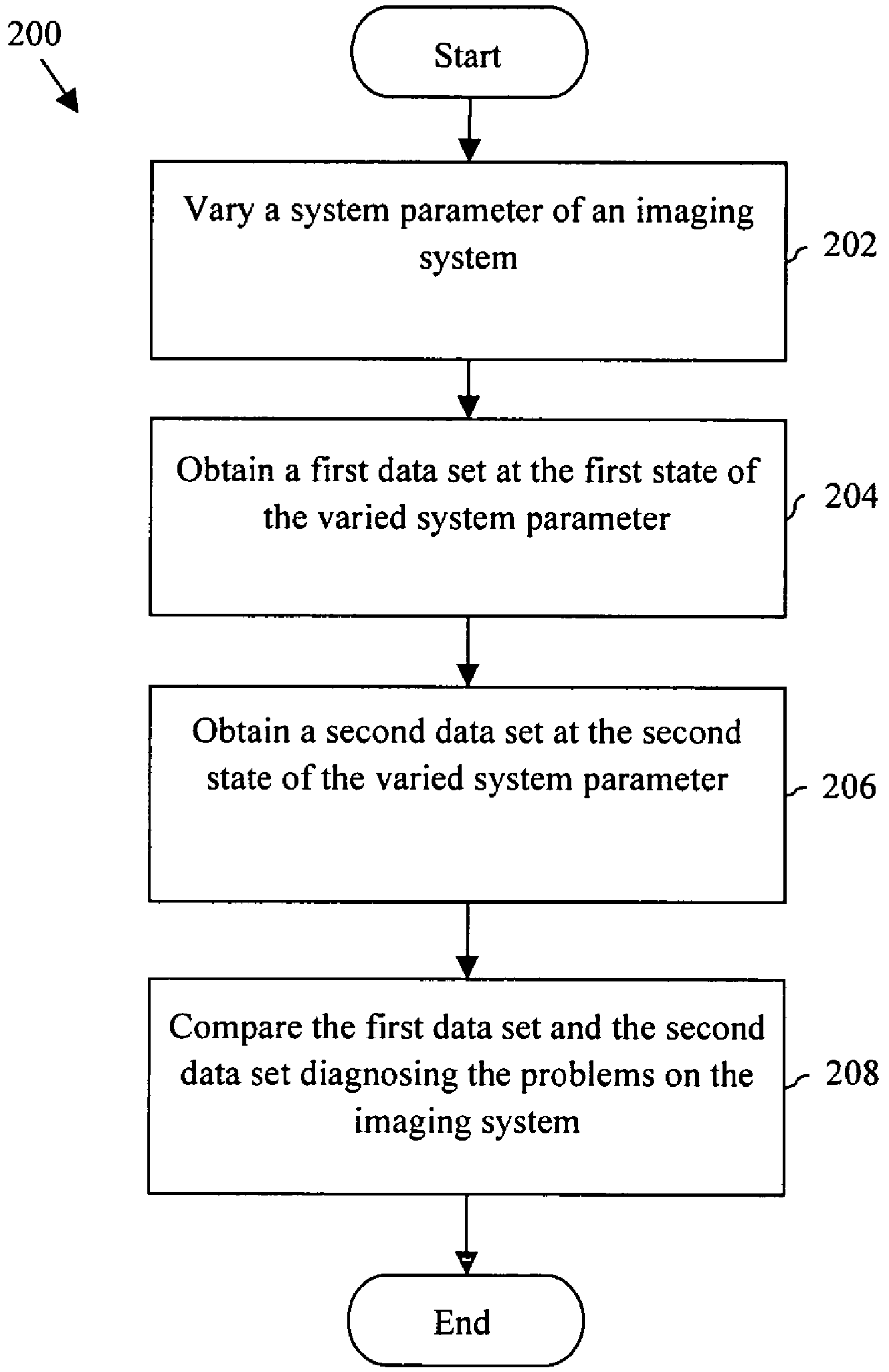
FIG. 2 is a flowchart illustrating a method for diagnosing an imaging system in accordance with an embodiment of the invention.

FIG. 2 is a flowchart illustrating a method 200 for diagnosing imaging system 100 in accordance with an embodiment of the invention. At 202, controller 104 varies a system parameter of imaging system 100. Exemplary system parameters include, but are not limited to, beam current, beam voltage, focal spot size, focal spot position, magnetic fields and RF fields. In an embodiment of the invention, the system parameter may be varied from a first state to a second state at a sub-harmonic frequency. For example, in a typical CT scan that obtains 1000 samples in one-second, i.e. 1 KHz sample rate, the system parameter may be varied at a frequency of 500 Hz. The system parameter may also be varied at any other sub-harmonics of a 1 KHz sample rate, for example 200 Hz or 250 Hz. In another embodiment of the invention, the system parameter is maintained static at the first state and a plurality of scans is performed. The system parameter is then varied and/or changed to the second state and another plurality of scans is performed.

At 204, image acquisition portion 102 obtains a first data set for object 108 at the first state of the varied system parameter. At 206, image acquisition portion 102 obtains a second data set for object 108 at the second state of the varied system parameter. The second state of the system parameter may be different or varied from the first state with respect to, for example, magnitude, position or time. For example, controller 104 may vary the magnitude of the beam current or the beam voltage, so as to change the resolution of the images obtained. Controller 104 also may, for example, change the size or the position of the focal spot, which changes the various image characteristics or the image view. At 208, processor 106 compares the first data set and the second data set for diagnosing imaging system 100. Processor 106 may compare the scan data corresponding to the first data set and the second data set for diagnosing imaging system 100. This comparison process may include taking the ratios of the first and second scan data or using standard deviation plots. For example, processor 106 may divide the first scan data set with the second scan data set to obtain a ratio to determine if the ratio is within a predefined range. The predefined range for the ratio may be, for example, within a tolerance range of 1, such as, within 0.95 to 1.05. In an embodiment of the invention, comparison of the data sets involves generating a difference image from the first data set and the second data set. For example, processor 106 may subtract the first data set from the second data set. In one embodiment of the invention, the system parameter may be varied between more than two states for diagnosing imaging system 100.

Figure 3:
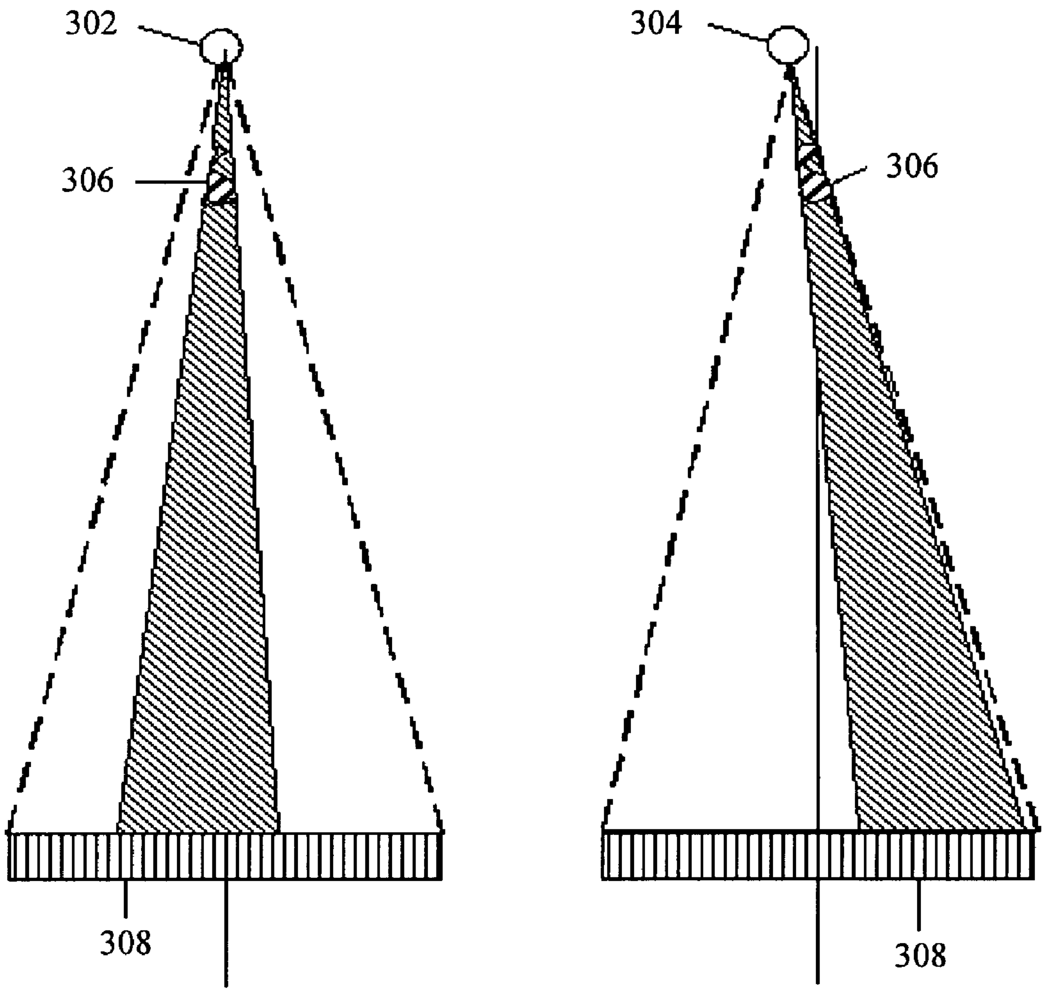
FIG. 3 is a diagram illustrating the effect of variation in a system parameter on the image generated by the imaging system in accordance with an exemplary embodiment of the invention.

FIG. 3 is a diagram illustrating the effect of variation in a system parameter on the image generated by imaging system 100. The system parameter being varied in this example is the position of the focal spot of an X-ray tube. With the variation in the focal spot from a first position 302 to a second position 304, the shadow of a particle 306 on a plurality of detectors 308 changes. The change in the image obtained is examined, according to various embodiments of the invention, to diagnose the problems related to imaging system 100. The focal spot of an X-ray tube can be varied using means described in connection with FIG. 4.

Figure 4:
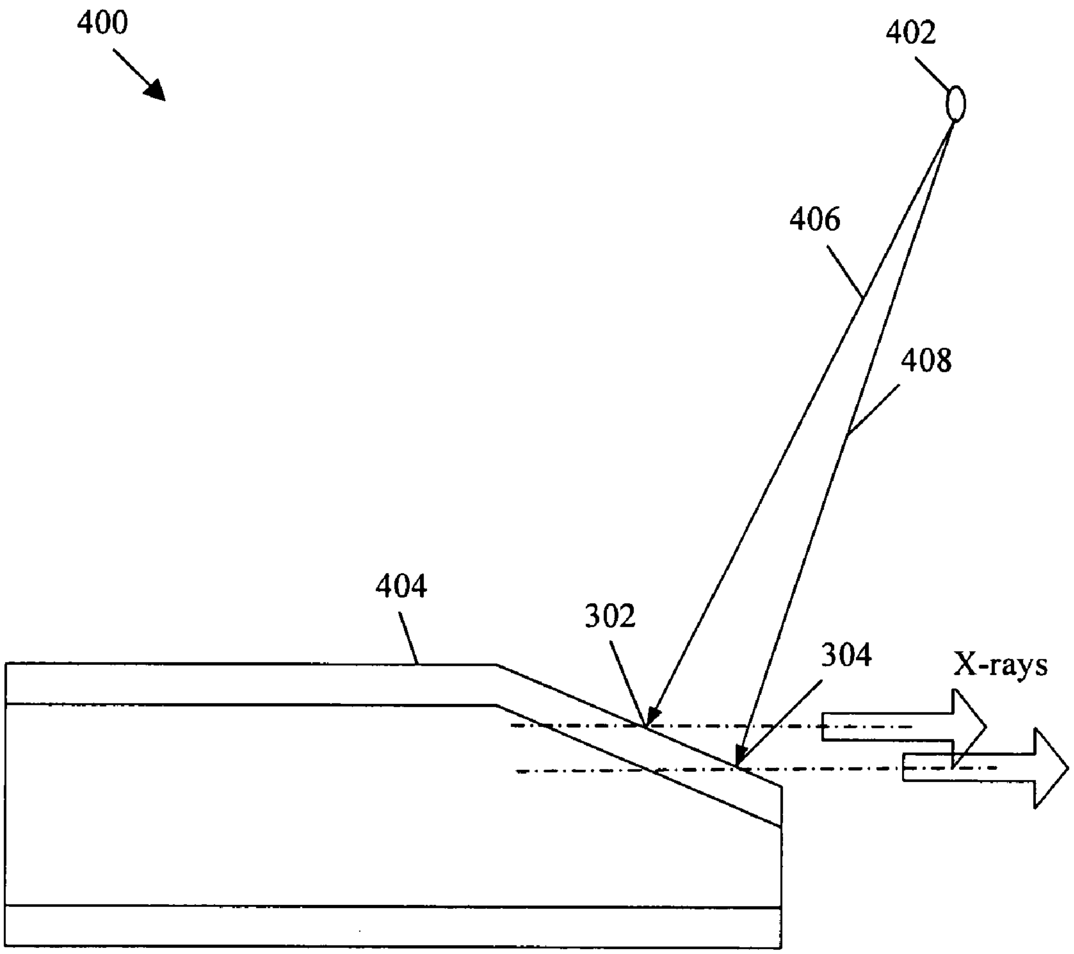
FIG. 4 is a block diagram illustrating an X-ray tube in accordance with an exemplary embodiment of the invention.

FIG. 4 is a block diagram illustrating the interior of an X-ray tube 400 in accordance with an exemplary embodiment of the invention. X-ray tube 400 includes a cathode 402 and an anode 404. Anode 404 may be constructed of a high density metal, such as, for example, tungsten. Application of a high potential difference between cathode 402 and anode 404 causes the generation of an electron beam from cathode 402. When this electron beam falls on anode 404, a high-energy beam of X-rays is released from an area on anode 404 called the focal spot.

The position of the focal spot differs in the cold state and the hot state of the X-ray tube. This causes a variation in the direction of the X-rays, thereby causing a slight change in the image obtained. This change in the focal spot can also be achieved more quickly by the application of electric and/or magnetic fields to the electron beam. In an embodiment of the invention, a magnetic field is applied to X-ray tube 400 using a deflection coil (not shown). This causes a deflection in the direction of electron beam from a first direction 406 to a second direction 408. The change in the direction of the electron beam causes a change in the position of the focal spot, and hence the direction of the X-rays produced.

In an exemplary embodiment of the invention, the focal spot can be varied between first position 302 and second position 304 at a sub-harmonic frequency, for example 500 Hz, wherein the sampling frequency is 1 KHz. This is referred to as sub-harmonic focal spot wobble and emulates the cold state and hot state of the X-ray tube, alternately. In this method, alternate samples are obtained with the focal spot (or other system parameter) in first position 302 and then in second position 304. Then the data sets obtained from first position 302 and second position 304 are interleaved to construct a single image, which is used to diagnose imaging system 100. In various embodiments of the invention, other sub-harmonic frequencies, such as 250 Hz, may be used. In this method, the first two samples are obtained at first position 302, the next two sample at second position 304, the following two sample at first position 302, and so on. In another embodiment of the invention, the focal spot is maintained static at first position 302 for a pre-defined period of time before being changed to second position 304. In this embodiment, a plurality of scans are performed with the focal spot at first position 302 to obtain a first data set and another plurality of scans is performed with the focal spot at second position 304 to obtain a second data set. These two data sets are then used to diagnose imaging system 100, by taking the ratios of the data sets or by generating a difference image.

Figure 5:
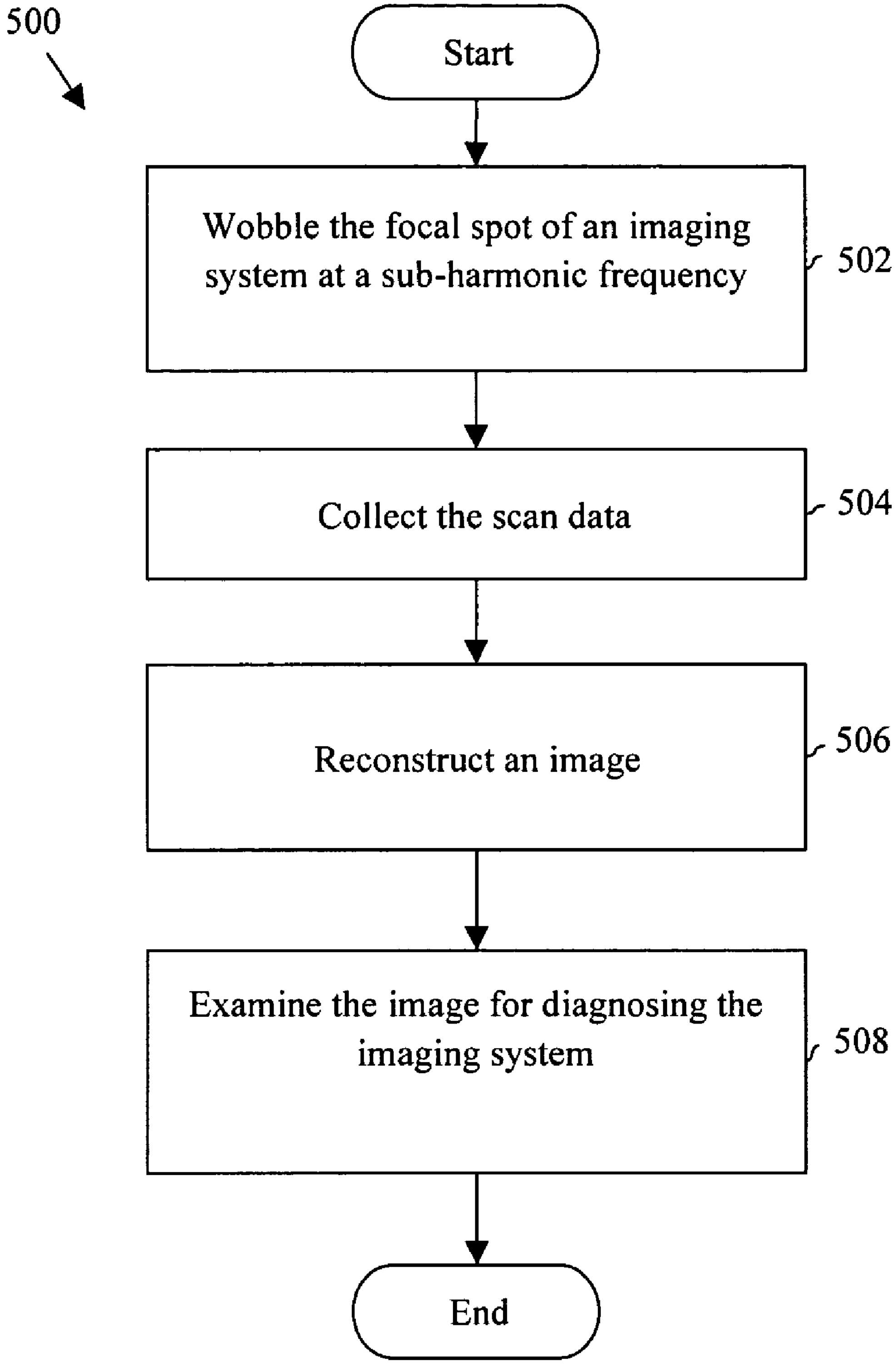
FIG. 5 is a flowchart illustrating a method in accordance with an exemplary embodiment of the invention for diagnosing an imaging system by varying the focal spot.

FIG. 5 is a flowchart illustrating a method 500 for diagnosing imaging system 100 by varying its focal spot in accordance with an exemplary embodiment of the invention. At 502, controller 104 wobbles the focal spot of the X-ray tube 400 between first position 302 and second position 304 at a sub-harmonic frequency as described above. The focal spot is varied by applying an electric and/or magnetic field to the electron beam through a deflection coil. In an exemplary embodiment of the invention, controller 104 shifts the focal spot between the first position 302 and second position 304 at a frequency of 500 Hz. In another embodiment of the invention, the position of the focal spot is maintained constant at first position 302 for a pre-defined period of time and a plurality of scans is performed. The focal spot is then changed to second position 304 and another plurality of scans is performed. In both the embodiments, the variation in focal spot position emulates the cold state and hot state of the X-ray tube. At 504, image acquisition portion 102 acquires scan data by scanning object 108. The scan data may be stored in memory unit 110. At 506, processor 106 reconstructs an image based on the scan data. In the reconstructed image, every other view of the image corresponds to a different position of the focal spot. At 508, the reconstructed image is examined to diagnose imaging system 100. If an artifact is present, its appearance changes with the change in focal spot position, enabling the diagnosis of imaging system 100.

Figure 6:
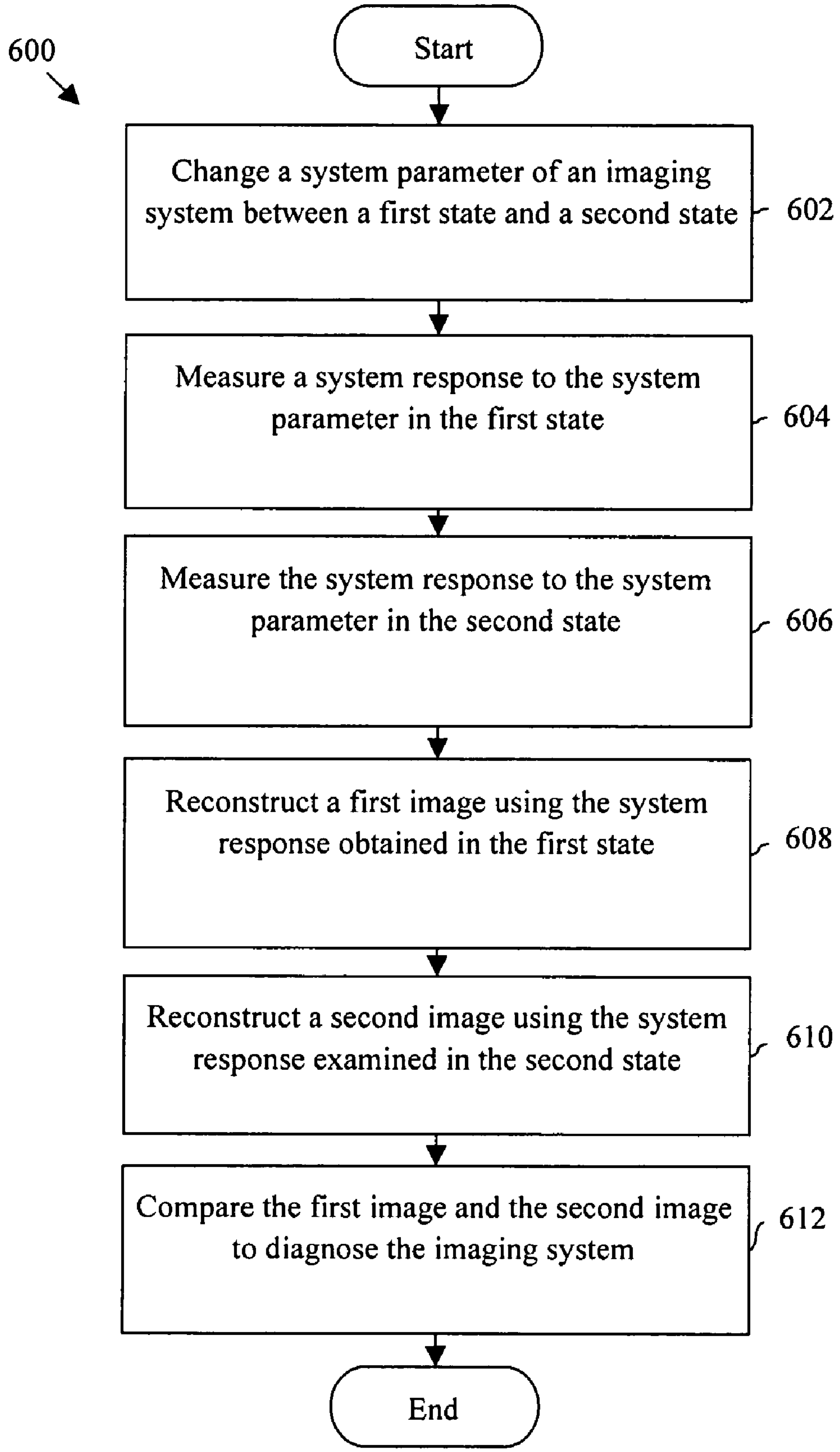
FIG. 6 is a flowchart illustrating a method in accordance with another embodiment of the invention for diagnosing an imaging system.

FIG. 6 is a flowchart illustrating a method 600 for diagnosing imaging system 100 in accordance with another embodiment of the invention. At 602, controller 104 changes a system parameter of imaging system 100 between a first state and a second state. In an embodiment of the invention, the system parameter may be changed at a sub-harmonic frequency. In another embodiment of the invention, the system parameter is maintained static at the first state and a plurality of scans is performed. The system parameter is then changed to the second state and another plurality of scans is performed. The system parameters varied may include, for example, beam current, beam voltage, focal spot size, focal spot position, magnetic fields and RF fields. At 604, image acquisition portion 102 measures a system response to the first state of the system parameter. In an embodiment of the invention, the system response may include the signal level obtained on the detection of the X-rays by plurality of detectors 308 (shown in FIG. 3), and acquisition of the scan data by a Data Acquisition System (DAS) (not shown). At 606, image acquisition portion 102 measures the system response to the second state of the system parameter. At 608, processor 106 reconstructs a first image using the system response obtained at the first state of the system parameter. At 610, processor 106 reconstructs a second image using the system response obtained at the second state of the system parameter. At 612, processor 106 compares the first image with the second image to diagnose imaging system 100. Processor 106 may either take the ratios or generate a difference image for diagnosing imaging system 100.

It should be noted that X-rays systems have been used in various embodiments of the invention for illustrative purposes only. The various embodiments may be implemented in connection with any type of imaging system, such as MRI systems, by varying quantities of interest to MRI systems.

Various embodiments of the present invention provide a method and a system that enables diagnosis of the imaging system in less time and with greater accuracy. The imaging system can reduce the time required from a few hours to a few seconds. This reduces the overall time required to diagnose a problem associated with the imaging system, which may result in increasing manufacturing throughput, or reducing service repair time.

While the invention has been described in terms of various specific embodiments, those skilled in the art will recognize that the invention can be practiced with modification within the spirit and scope of the claims.

What is claimed is:

1. A method for diagnosing an imaging system, said method comprising:

obtaining a first data set by scanning an object at a first state of a system parameter of the imaging system;

varying the system parameter from the first state to a second state at a sub-harmonic frequency;

obtaining a second data set by scanning the object at the second state of the system parameter; and comparing the first data set and the second data set to diagnose the imaging system.

2. A method in accordance with claim 1 wherein the first data set comprises a first set of samples and the second data set comprises a second set of samples, said method further comprising interleaving the first set of samples and the second set of samples to form a single image.

3. A method in accordance with claim 1 further comprising:

forming a first image from the first data set; and forming a second image from the second data set.

4. A method in accordance with claim 1 further comprising generating a difference image from the first data set and the second data set.

5. A method in accordance with claim 1 wherein comparing the first and second data sets comprises comparing scan data corresponding to the first and second data sets.

6. A method in accordance with claim 1 wherein the system parameter comprises one of a beam current, a beam voltage, a focal spot size, a focal spot position, magnetic fields, and Radio Frequency fields.

7. A method in accordance with claim 1 wherein varying the system parameter comprises varying the system parameter in at least one of magnitude, position, and time.

8. A method in accordance with claim 1 further comprising:

acquiring the first data set at a first position of the imaging system; and acquiring the second data set at a second position of the imaging system, the first and second positions being different.

9. A method in accordance with claim 1 further comprising:

positioning an object in an imaging field; and measuring at least one system transfer function.

10. A method in accordance with claim 1 further comprising diagnosing the imaging system based on the comparing.

11. A method in accordance with claim 1 wherein comparing the first data set and the second data set further comprises determining a difference between the first data set and the second data set.

12. A method for diagnosing an imaging system, said method comprising:

measuring a system response to a system parameter of the imaging system in a first state;

changing the system parameter between the first state and a second state at a sub-harmonic frequency;

measuring the system response to the system parameter in the second state;

comparing the system response in the first state with the system response in the second state; and diagnosing the imaging system based on the comparing.

13. A method in accordance with claim 12 wherein the system parameter comprises a focal spot position.

14. A method in accordance with claim 12 wherein changing the system parameter comprises varying the system parameter between different views of the imaging system.

15. An imaging system comprising:

an image acquisition portion for acquiring image data;

a controller configured to control the image acquisition portion and to vary a system parameter of said imaging system, said controller further configured to:

obtain a first data set by scanning an object at a first state of a system parameter of the imaging system;

vary the system parameter from the first state to a second state that is different than the first state at a sub-harmonic frequency;

obtain a second data set by scanning the object at the second state of the system parameter;

compare the first data set and the second data set; and diagnose said imaging system based on the comparison.

16. An imaging system in accordance with claim 15 wherein the imaging system comprises one of a computed tomography system, an X-ray system, and a magnetic resonance system.

17. An imaging system in accordance with claim 15 wherein the controller is configured to interleave the first data set and the second data set to form a single image.

18. An imaging system in accordance with claim 15 wherein the controller is configured to:

form a first image from the first data set; and form a second image from the second data set.

19. An imaging system in accordance with claim 15 wherein the system parameter comprises one of a beam current, a beam voltage, a focal spot size, a focal spot position, magnetic fields, and radio frequency fields.

* * * * *

UNITED STATES PATENT AND TRADEMARK OFFICE

CERTIFICATE OF CORRECTION

PATENT NO. : 7,623,272 B2
APPLICATION NO. : 11/086536
DATED : November 24, 2009
INVENTOR(S) : Bruce Matthew Dunham It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this

Twenty-sixth Day of October, 2010

David J. Kappos
*Director of the United States Patent and Trademark Office*